United States Patent
Norton, Jr. et al.

(10) Patent No.: US 12,500,895 B2
(45) Date of Patent: Dec. 16, 2025

(54) ACCESS CONTROL SYSTEM WITH USER PROFILES IDENTIFYING USER DATA SOURCES FOR VERIFYING USER IDENTITY DURING A LOGIN ATTEMPT

(71) Applicant: Lenovo Enterprise Solutions (Singapore) Pte Ltd., Singapore (SG)

(72) Inventors: Robert James Norton, Jr., Raleigh, NC (US); Rinawl Ronald Sequeira, Milton (CA); Zachary Ransom, Denver, CO (US)

(73) Assignee: Lenovo Enterprise Solutions (Singapore) Pte Ltd., Singapore (SG)

( * ) Notice: Subject to any disclaimer, the term of this patent is extended or adjusted under 35 U.S.C. 154(b) by 160 days.

(21) Appl. No.: 18/478,785

(22) Filed: Sep. 29, 2023

(65) Prior Publication Data
US 2025/0112925 A1 Apr. 3, 2025

(51) Int. Cl.
*H04L 9/40* (2022.01)

(52) U.S. Cl.
CPC ........ *H04L 63/102* (2013.01); *H04L 63/0861* (2013.01); *H04L 63/105* (2013.01); *H04L 63/107* (2013.01)

(58) Field of Classification Search
CPC . H04L 63/102; H04L 63/0861; H04L 63/105; H04L 63/107
USPC ......................................................... 726/24
See application file for complete search history.

(56) References Cited

U.S. PATENT DOCUMENTS

| | | | |
|---|---|---|---|
| 8,978,123 B2 * | 3/2015 | Nichols | H04L 63/083 726/8 |
| 10,200,377 B1 * | 2/2019 | Vazquez | H04L 63/102 |
| 11,057,389 B2 * | 7/2021 | Ocher | H04L 63/105 |
| 11,489,829 B1 * | 11/2022 | Ulrich | H04L 63/0861 |
| 2007/0136792 A1 * | 6/2007 | Ting | G06F 21/32 726/5 |
| 2010/0083353 A1 * | 4/2010 | Wang | G06F 21/36 726/5 |
| 2013/0198836 A1 * | 8/2013 | Wuellner | G06F 21/32 726/19 |

(Continued)

OTHER PUBLICATIONS

Michael Dalton; Nemesis: Preventing Authentication & Access Nemesis: Preventing Authentication & Access; USENEX; 2009; pp. 1-16.*

*Primary Examiner* — Monjur Rahim
(74) *Attorney, Agent, or Firm* — Jeffrey L. Streets

(57) ABSTRACT

The operations of a computer program include receiving login credentials from a person using a computing device during an active login attempt to gain access to a system resource. A user profile associated with the login credentials is identified, and data is obtained from a plurality of user data sources identified within the user profile, such as a user calendar, positioning system sensor, and/or biometric sensor. For each user data source, it is determined whether the obtained data supports a conclusion that the person attempting the login is the authorized user associated with the user profile. A set of authentication factors is selected as a function of the user data sources for which the obtained data does not support the person being the authorized user. The person may be granted access to the system resource upon receiving additional input from the person satisfying the selected set of authentication factors.

20 Claims, 5 Drawing Sheets

(56) References Cited

U.S. PATENT DOCUMENTS

| | | | |
|---|---|---|---|
| 2013/0312075 A1* | 11/2013 | Nichols | H04L 63/0815 726/8 |
| 2015/0058959 A1* | 2/2015 | Gordon | H04W 12/082 726/7 |
| 2016/0337353 A1* | 11/2016 | Coats | H04W 12/06 |
| 2017/0163623 A1* | 6/2017 | Fouad | H04L 63/083 |
| 2017/0289120 A1* | 10/2017 | Kohli | H04L 63/08 |
| 2019/0286808 A1* | 9/2019 | Newton | H04L 63/0815 |
| 2019/0319958 A1* | 10/2019 | Ocher | H04L 63/18 |
| 2021/0152537 A1* | 5/2021 | Bengani | H04L 63/123 |
| 2024/0241927 A1* | 7/2024 | Richman | G06F 21/6218 |

* cited by examiner

User Profile #123

Name
Address
Phone #

Authorized System Resources

Accessed System Resources (Successful Login History)

| Resource | Day/Time | Login Location | Biometrics, etc. |
|---|---|---|---|
| Application A | | Office | |
| Data B | | Office | |
| Application A | | Home | |

Data Sources

| Type | Address | Credentials | Data Available |
|---|---|---|---|
| Laptop | IP Address | | location, voice, face, fingerprint |
| Smartphone | IP Address | | location, voice, face |
| Calendar | http://outlook | | event schedule (type, loc., time) |
| Smart Watch | IP Address | | location, heartrate, activity |

Authentication Factors

Username
Password
PIN

One-time Pwd to Phone Enabled? ●
Fingerprint Stored/Data Source Enabled? ●
Voice Sample Stored/Data Source Enabled? ●
Facial Recognition Setup? ●
Retina/Iris Scans Enabled? ○
Geolocation Enabled? ●
Touchscreen Gesture Stored/Enabled? ○

*FIG. 2*

ACCESS CONTROL SYSTEM WITH USER PROFILES IDENTIFYING USER DATA SOURCES FOR VERIFYING USER IDENTITY DURING A LOGIN ATTEMPT

BACKGROUND

The present disclosure relates to user authentication during an attempt to gain access to a system resource.

BACKGROUND OF THE RELATED ART

Security systems and applications may be used to prevent unauthorized persons from accessing various types of system resources, such as computer systems, networks, application programs and data storage. To gain access to a given system resource, a person may be required to submit user credentials, such as a username and password. While requiring these user credentials is helpful to limit access to the system resource, any person that learns or obtains the user's credentials can login as the user and access the system resource with all the privileges of the user. The consequences of the unauthorized person gaining access to the system resources could range from unauthorized use of the system resource to a data breach or a destruction of data and/or equipment.

BRIEF SUMMARY

One embodiment provides a computer program product comprising a non-volatile computer readable medium and non-transitory program instructions embodied therein, the program instructions being configured to be executable by a processor to cause the processor to perform various operations. The operations comprise receiving user login credentials for an active login attempt, wherein the user login credentials are received from a computing device in response to input from a person to the computing device to gain access to a system resource. The operations further comprise identifying a user profile associated with the user login credentials, wherein the user profile is stored within an authorized user data structure including a plurality of user profiles, and obtaining data from a plurality of user data sources identified within the user profile in response to receiving the user login credentials, wherein the plurality of user data sources includes a user calendar, a positioning system sensor, and/or a biometric sensor. Still further, the operations comprise determining, for each of the plurality of user data sources from which the data is obtained, whether the obtained data is consistent with a conclusion that the person from which the login credentials are received is the user associated with the user profile, and selecting one of a plurality of sets of authentication factors as a function of the plurality of user data sources for which it is determined that the obtained data is not consistent with the conclusion that the person is the user associated with the user profile. In addition, the operations comprise granting the person access to the system resource in response to receiving additional input from the person satisfying the selected set of authentication factors.

BRIEF DESCRIPTION OF THE SEVERAL VIEWS OF THE DRAWINGS

FIG. 2 is a diagram of an authorized user data structure that may be used by the security application.

DETAILED DESCRIPTION

Figure 1:
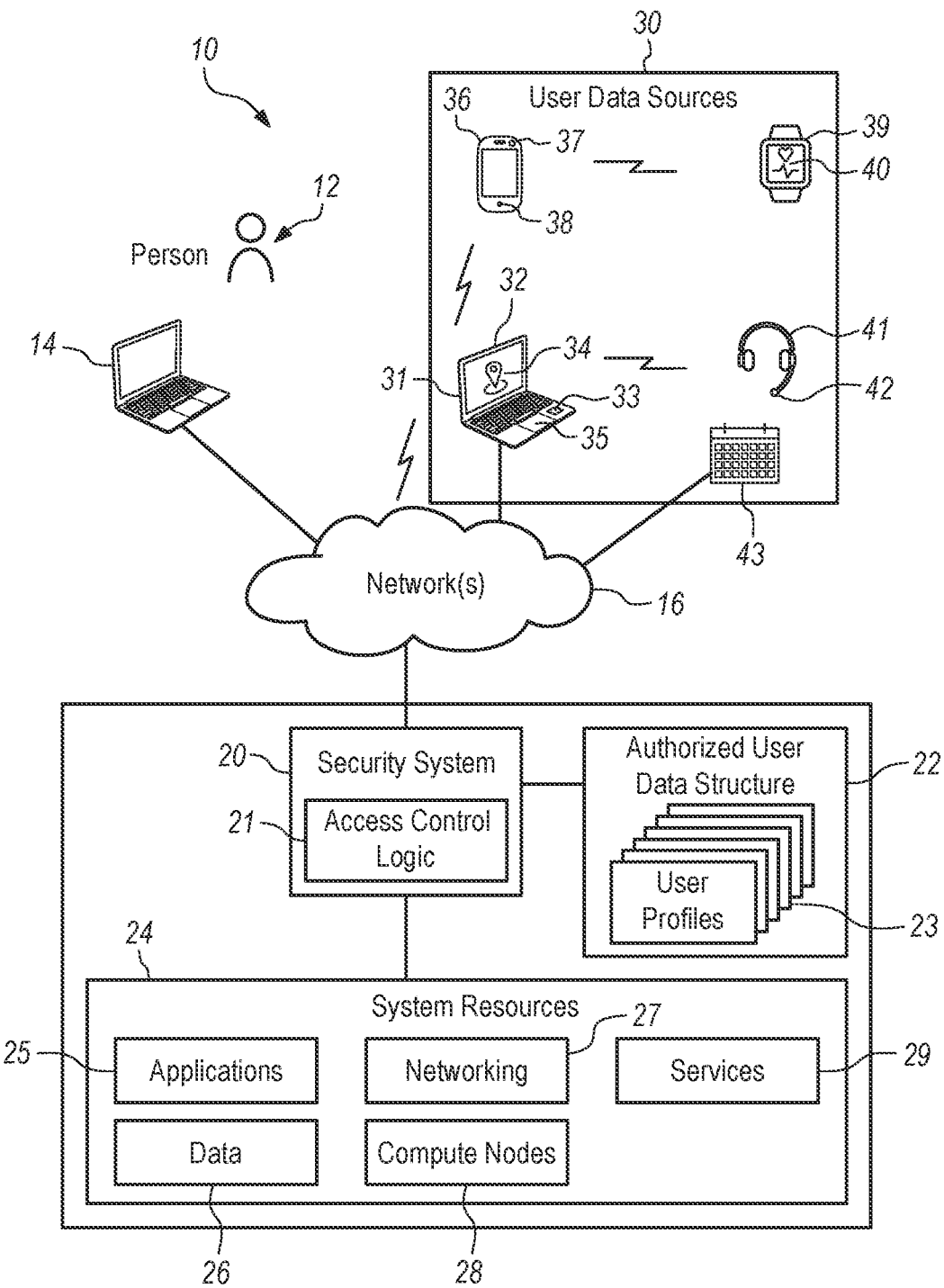
FIG. 1 is a diagram of a system including a security application controlling access to various system resources.

One embodiment provides a computer program product comprising a non-volatile computer readable medium and non-transitory program instructions embodied therein, the program instructions being configured to be executable by a processor to cause the processor to perform various operations. The operations comprise receiving user login credentials for an active login attempt, wherein the user login credentials are received from a computing device in response to input from a person to the computing device to gain access to a system resource. The operations further comprise identifying a user profile associated with the user login credentials, wherein the user profile is stored within an authorized user data structure including a plurality of user profiles, and obtaining data from a plurality of user data sources identified within the user profile in response to receiving the user login credentials, wherein the plurality of user data sources includes a user calendar, a positioning system sensor, and/or a biometric sensor. Still further, the operations comprise determining, for each of the plurality of user data sources from which the data is obtained, whether the obtained data is consistent with a conclusion that the person from which the login credentials are received is the user associated with the user profile, and selecting one of a plurality of sets of authentication factors as a function of the plurality of user data sources for which it is determined that the obtained data is not consistent with the conclusion that the person is the user associated with the user profile. In addition, the operations comprise granting the person access to the system resource in response to receiving additional input from the person satisfying the selected set of authentication factors.

A user is a person who utilizes a system resource, such as a computer, network service, application program and/or data source. An authorized user is a user that has been given permission (authority) to utilize the system resource. In order to distinguish an authorized user from an unauthorized person, a computer security system or application (the verifier) may maintain an authorized user data structure storing a user profile for each authorized user. For example, the authorized user data structure may be a database or list including individual records, where each record may include multiple fields and where each field may store a piece of user data.

Each user profile stores the login credentials for a specific user and may store additional information about the user, such as the identification or addresses of the plurality of user data sources including, but not limited to, the user calendar, the positioning system sensor, and/or the biometric sensor. Each authorized user may have unique login credentials, such as a username, password, or similar data. The credentials may serve to both identify the user/user profile as well as to authenticate that the person submitting the credentials is in fact the user associated with the user profile. For this purpose, the password or similar data, such as a personal identification number (PIN), is preferably a secret only known to the specific user and the verifier. The password may be a simple string of characters including letters, digits and/or symbols. Upon receiving the user login credentials, the security system or application may identify a user profile associated with the user login credentials by searching the authorized user data structure for a user profile storing each element of the user credentials, such as the username and password.

A login attempt is a process of interaction with the security system for the purpose of gaining access to a system resource. In one example, a login attempt may begin when a person identifies or navigates to a system resource that they desire to access and/or when the person submits login credentials to the security system. Numerous operations may occur during the login attempt in order to identify and authenticate the user. The login attempt may be completed either when the security system has authenticated the person as an authorized user and provided the authorized user with access to the requested system resource or when the security system determines that the person should not be authenticated and prevents the person from accessing the requested system resource. A login attempt that is pending (i.e., has begun but has not yet competed) may be referred to herein as an "active login attempt." By contrast, a historical record of previous login attempts, such as a historical record of previous successful login attempts, may store details about a login attempt that is already complete. Optionally, a login attempt may have a timeout period, such that a login attempt must start over if not completed with a predetermined period of time.

The security system or application that controls access to the system resource(s) may receive the user login credentials from a computing device in response to input from a person to the computing device to gain access to a system resource. The computing device may be a smartphone, general purpose computer (table, notebook, laptop, desktop, tower and the like), or a computing device that is dedicated for accessing a system resource. Furthermore, the computing device may communicate with the security system or application via a wired and/or wireless network, including a local area network and/or a wide area network, such as the Internet.

The system resources may include, without limitation, a computer, network service, application program and/or data source. The system resources may, for example, be hosted in a public or private datacenter, including any of various types of cloud computing environments and/or virtualization environments.

Embodiments may provide a user profile that stores identification of a plurality of user data sources and may include operations for obtaining user data from one or more of the identified user data sources. For example, a user data source may be identified by a network address and/or user credentials specific to the user data source. Accordingly, the security system or application may obtain user data from a plurality of user data sources identified within the user profile in response to receiving the user login credentials. Non-limiting examples of the plurality of user data sources include a user calendar, a positioning system sensor, and/or a biometric sensor. The user data obtained from the user data source may be contemporaneous user data that is measured by the data source during the login attempt as well as being received by the security system during the login attempt. Embodiments using a variety of user data sources are described herein.

Embodiments may include making a separate determination, for each of the plurality of user data sources from which the data is obtained, whether the obtained data is consistent with a conclusion that the person from which the login credentials are received is the user associated with the user profile. The obtained data is consistent with a conclusion that the person from which the login credentials are received is the user associated with the user profile if the obtained data supports authentication of the user. The obtained data is not consistent (i.e., inconsistent) with a conclusion that the person from which the login credentials are received is the user associated with the user profile if the obtained data does not support authentication of the user. Where each of a plurality of user data sources are identified in the user profile and user data is obtained from a plurality of the identified user data sources, the separate determinations whether the obtained data is consistent with the person being the authorized user (i.e., supports authentication of the authorized user) may increase or decrease a level of confidence that the person is the authorized user.

The security system or application receives user credentials, such as a username and password, and may require that the received user credentials be an identical match with user credentials stored in a single user profile. Specifically, a single incorrect character in either the username or the password may cause the security system or application to reject or deny the login attempt. Accordingly, some embodiments will be unable to identify a specific user profile without receiving both a correct username and a correct password for a single user profile. However, a determination whether data obtained from a user data source is consistent or inconsistent with the person being the authorized user may use an objective comparison between obtained data and stored data that does not require an identical match. For example, a biometric sensor may measure a human characteristic, yet there may be some variation in the measurement over time perhaps due to actual variation or change in the human characteristic, a variation (also known as noise, interference or artifacts) in the sensor itself, or a change in the conditions existing during the measurements. Therefore, obtained biometric data may be determined to "match" stored (reference) biometric data if the comparison yields a positive verification that the person is the authorized user. In some options, the positive verification may include calculating a similarity score based on a comparison of the obtained and stored (reference) biometric data and determining whether the genuine score is greater than a threshold score.

It is possible that authorized users may have different numbers (i.e., a greater or lesser number) of user devices and/or different types (i.e., facial recognition, fingerprint recognition, gesture recognition, voice recognition, heart rate sensor, etc.) of user devices that are available for obtaining user data. Still, the security system may obtain user data from each of the user devices that are identified in the individual user's profile and the obtained user data may be used as an authentication factor (i.e., a factor that may verify the identity of the authorized user). Some embodiments may select one of the plurality of sets of authentication factors as a function of the plurality of user data sources for which it is determined that the obtained data is not consistent with the conclusion that the person is the user associated with the user profile.

Embodiments may provide a plurality of sets of authentication factors. Each set of authentication factors may include one or more authentication factors that must be provided by the person attempting login to the system resource and received by the security system. Based upon the type and number of authentication factors with a given set, the set of authentication factors may be associated with a level of confidence that the person submitting the user credentials to the security system is the authorized user whose user profile includes those user credentials. The plurality of sets of authentication factors may be formed to provide a range of confidence levels, such as each set of authentication factors being associated with a different confidence level. The sets of authentication factors may be predetermined or determined in real time based upon a need for a set of authentication factors having a higher confidence level. The authentication factors may include one or more knowledge factors such as a password or personal identification number (PIN); one or more possession factors such as a one-time password sent to the user's registered mobile phone; one or more inherence factors such as fingerprints, voice recognition, facial recognition, retina or iris scans; one or more location factors such as a geolocation, Internet Protocol (IP) address, or Media Access Control (MAC) address; and/or one or more behavior factors such as a secret touchscreen gesture or selection of a picture password among a group of pictures. Furthermore, these authentication factors may be combined with the use of a virtual private network (VPN) connection where the link between the user's computing device and the system resource is an encrypted link.

In some embodiments, each set of the authentication factors may differ from the other sets of authentication factors by one or more specific authentication factors and/or the number of authentication factors. In one example, five sets of authentication factors may provide five different levels of confidence, where each of the five sets includes a single authentication factor. This is possible where the five sets of authentication factors each having a single authentication factor having a different confidence level than the other authentication factors. In another example, five sets of authentication factors may provide five different levels of confidence, where each of the five sets includes a different number of authentication factors. Optionally, the five sets of authentication factors may include a first set having a single authentication factor, a second set having two authentication factors, a third set having three authentication factors, a fourth set having four authentication factors, and a fifth set having five authentication factors. Aspects of these two examples may be combined to provide a range of confidence levels that balance security and usability.

In some embodiments, for each of the plurality of sets of authentication factors, the set of authentication factors may be associated with a different level of confidence that the person is the user associated with the user profile. The operation of selecting one of the plurality of sets of authentication factors may include selecting the set of authentication factors so that the associated level of confidence increases with an increasing number of the plurality of user data sources for which it is determined that the obtained data is not consistent with the conclusion. Still, the security system or application may grant the person access to the system resource in response to receiving input from the person satisfying the selected set of authentication factors. In other words, the login process may be completed and the user computing device that initiated the login attempt may then access and make use of the requested system resource. However, the user profile of an authorized user may identify authorized system resources for the user, such that the authorized user is only granted access to those system resources for which the user is authorized. The user profile could also be leveraged to implement other aspects of the system resource usage, such as limiting to the user to "read only" access without the authority to "write or delete" data.

In some embodiments, the user profile may include an identification of authorized system resources, an identification of accessed system resources, identification of a user device with a positioning system, identification of a user calendar, and/or identification of one or more biometric devices. Optionally, the user profile may further include a historical record of successful user logins, wherein each successful user login includes a timestamp, contemporaneous location, contemporaneous biometric sensor data, and identification of the accessed system resource. Other information may be included in the user profile to support implementation of the various disclosed embodiments.

In some embodiments, at least one of the plurality of user data sources is a biometric sensor. In a preferred option, the data obtained from the biometric sensor is contemporaneous biometric sensor data measured by the biometric sensor during the active login attempt, and the user profile identifies stored biometric sensor data obtained during a previous successful login for the user. Furthermore, the operation of determining whether the obtained data is consistent with the conclusion that the person is the user associated with the user profile may include determining whether the contemporaneous biometric sensor data is consistent with the stored biometric sensor data. In other words, the contemporaneous biometric sensor data may be determined to be consistent with the stored biometric sensor data if it supports a positive verification that the contemporaneous biometric sensor data was obtained from the same person as the stored biometric sensor data.

In some embodiments, the user profile includes an identification of one or more authorized system resources that the user is authorized to access. Non-limiting examples of the one or more authorized system resources include an application, data, network, computing node, and/or network infrastructure. In one option, the identification of the one or more authorized system resources included in the user profile may identify a role assigned to the user associated with the user profile, wherein the role has a predetermined association with one or more specific system resources. For example, the roles may be selected from a system administrator, a software engineer, an operations technician, etc. In another option, the operations may further comprise identifying a system resource for which the user login credentials have been received for the active login attempt, accessing the identification of one or more authorized system resources associated with the user profile, and determining whether the identification of one or more authorized system resources includes the identified system resource. The operation of selecting one of a plurality of sets of authentication factors may then include selecting the set of authentication factors that is associated with an incrementally higher level of confidence than otherwise selected in response to determining that the identification of one or more authorized system resources does not include the identified system resource.

In some embodiments, the user profile includes a historical record of successful user logins, wherein each successful user login includes an identification of the accessed system resource. In various embodiments herein, the historical record of successful user logins may include additional details associated with the successful user login, such as login location, login time, user biometric data, etc. Optionally, the operations may further comprise identifying the system resource for which the user login credentials have been received for the active login attempt, and determining whether the historical record of successful user logins associated with the user profile includes the identified system resource. The operation of selecting one of a plurality of sets of authentication factors may include selecting the set of authentication factors that is associated with an incrementally higher level of confidence than otherwise selected in response to determining that the historical record of successful user logins does not include the identified system resource. In other words, if the person is attempting to access a system resource that the user profile indicates has not been accessed before, then additional authentication may be required.

In some embodiments, the operations may further comprise identifying a time at which the user login credentials are received from the computing device and accessing a historical record of previous successful logins associated with the identified user profile, wherein each of the previous successful logins is associated with a login time. The operations may further comprise determining whether the identified time is within a range of the login times within the historical record of previous successful logins, and the operation of selecting one of a plurality of sets of authentication factors may include selecting the set of authentication factors that is associated with an incrementally higher level of confidence than otherwise selected in response to determining that the identified time is not within the range of the login times. In other words, if the person is attempting to access a system resource at a time that the user profile indicates is different or unusual for user to access the system resource, then additional authentication may be required. Optionally, the identified time for the active login attempt and the login time associated with each of the previous successful logins includes a time of day and/or a day of the week, month or year.

In some embodiments, the one or more user data sources may include a positioning system sensor. For example, the positioning system sensor may be integrated into the user's computing device, such as the global position system sensor in a smartphone. Accordingly, the contemporaneous location of the user may be determined by the computing device using the positioning system sensor during the active login attempt. The operations of the security system or application may further comprise identifying a contemporaneous location of the computing device from which the user login credentials are received for the active login attempt and accessing a historical record of previous successful logins associated with the identified user profile, wherein each of the previous successful logins is associated with a login location. Still further, the operations may comprise determining whether the identified contemporaneous location of the computing device is within a predetermined proximity of one of the login locations associated with one or more of the previous successful logins. The selection of one of the plurality of sets of authentication factors may include selecting the set of authentication factors that is associated with an incrementally higher level of confidence than otherwise selected in response to determining that the identified contemporaneous location of the computing device is not within the predetermined proximity of one of the login locations associated with the one or more of the previous successful logins.

Some embodiments may include updating the historical record of previous successful logins to include a further successful login associated with the identified user profile. For example, the historical record of previous successful logins may be updated to include a successful login from a location that is not with the predetermined proximity of one of the previous login locations. Accordingly, the location may not have been a previous login location, but it may become a previous login location as a result of a successful login from that location.

In some embodiments, the one or more user data sources may include a user calendar, such as a user calendar in which each calendar entry identifies an event, an event location, and an event day and time. The operations may further comprise identifying the user calendar associated with the identified user profile, wherein the user calendar includes a plurality of calendar entries. Still further, the operations may comprise identifying one of the calendar entries that identifies the event day and time including the current day and time and identifying the event location identified in the identified calendar entry. Where the data obtained from the positioning system sensor is the contemporaneous location of the computing device during the active login attempt, the security system or application may determine whether the contemporaneous location of the computing device is within a predetermined proximity of the identified event location. Furthermore, the selection of one of a plurality of sets of authentication factors includes selecting the set of authentication factors that is associated with an incrementally higher level of confidence than otherwise selected in response to determining that the current location of the computing device is not within a predetermined proximity of the identified event location.

In some embodiments, the one or more user data sources includes a user calendar. The operations may further comprise identifying the user calendar associated with the identified user profile, wherein the user calendar includes a plurality of calendar entries, and each calendar entry identifies an event type, an event location, and an event day and time. Still further, the operations may comprise identifying one of the calendar entries that identifies the event type as vacation, and determining whether the current day and time is within the identified event day and time identified by the identified calendar entry. The selection of one of a plurality of sets of authentication factors may include selecting the set of authentication factors that is associated with an incrementally higher level of confidence than otherwise selected in response to determining that the current day and time is within the identified event day and time.

In some embodiments, the one or more user data sources includes a biometric sensor, and the operations further comprise identifying a biometric sensor associated with the identified user profile, wherein the biometric sensor produces biometric output for the user and the biometric output from the identified biometric sensor device is contemporaneous biometric output obtained during the active login attempt. The operations may further comprise accessing a historical record of previous successful logins associated with the identified user profile, wherein, for each of the previous successful logins, the previous successful login is associated with biometric output from the biometric sensor obtained during the previous successful login. Still further, the operations may comprise determining whether the obtained contemporaneous biometric output is within a predetermined range, or supports a positive verification, of the biometric output associated with one or more of the previous successful logins. The selection of one of a plurality of sets of authentication factors may include selecting the set of authentication factors that is associated with an incrementally higher level of confidence than otherwise selected in response to determining that the contemporaneous biometric output is not within the predetermined range, or does not support a positive verification, of the biometric output associated with the one or more of the previous successful logins. In one option, the biometric sensor may be a heart rate sensor and the contemporaneous biometric output of the heart rate sensor may include a heart rate.

In some embodiments, the operation of selecting one of a plurality of sets of authentication factors may include selecting the set of authentication factors that is associated with an incrementally higher level of confidence for each of the user data sources from which the obtained data is not consistent with the conclusion that the person is the user associated with the user profile. In one option, the operations may further comprise determining a number of user data sources from which the obtained data is not consistent with the conclusion that the person is the user associated with the user profile, determining whether the determined number of user data sources is greater than a predetermined number of inconsistent authentication factors, and requiring, in response to determining that the determined number of user data sources is greater than the predetermined number of inconsistent authentication factors, receipt of approval from a second user as a condition to completing the active login attempt.

Some embodiments provide the technical benefit of preventing an unauthorized person from using the login credentials of an authorized user to access a system resource. An authorized user profile may include additional user information that facilitates an authentication decision in consideration of the contemporaneous (current) circumstances of the authorized user associated with the user profile.

In some embodiments, the user profile may be created by a System Administrator or other authorized person, perhaps during a new user onboarding and possibly stored by a server running the security system or application. Optionally, the user profile may be created by an authorized user when a user logs into the security system or a system resource for the first time. Furthermore, an existing user profile may be supplemented by entry of additional data. For example, the user profile may be created or supplemented to include an identification of authorized system resources, an identification of accessed resources, historical system access data including a timestamp and/or a duration, identification of a user device with a positioning system, identification of a user calendar, and identification of one or more biometric devices. The system and/or the user may configure the one or more biometric devices (i.e., wearables or IR camera) and test communication between the security system and the biometric devices that are identified within the user profile.

In some embodiments, the user profile may store an identification of system resources that the user is authorized to access ("authorized resources") and/or an identification of system resources that the user has actually accessed ("accessed resources"). The authorized resources and/or the accessed resources may be any system resource that is available, such as an application, data, networks, compute nodes, network infrastructure, etc. In one option, the authorized resources may be indirectly identified by assigning a "role" to the user profile, where the system may have a predetermined association between a defined "role" and the system resources that may be accessed by any user assigned with that "role." For example, during a login attempt using the login credentials for a given user profile, if the login is attempting access to a system resource that is not within the user's authorized resources and/or is inconsistent with the user's previously accessed resources, then the security system may require additional authentication factors. For example, additional authentication factors may be required for the user to access a highly confidential new product portfolio that is not within their "authorized resources" or that is not one of the user's previously accessed resources (even if it is an authorized resource).

In some embodiments, the user profile may also store historical data identifying the time of day/week and/or the duration of access to any particular system resource. Accordingly, if the login credentials associated with a user profile are used to attempt login to the particular system resource, the current time (i.e., the day, week or duration) of the active login attempt may be compared to the historical data or previous successful logins associated with the user profile. If the current time is consistent (i.e., within some range) with the historical login times, then the current time does not cause the current login attempt to be suspect and the login attempt (authentication process) is allowed to proceed.

In some embodiments, the user profile may store identifying information about a user computing device that the user uses to authenticate into the system. The location of that computing device during each authentication process or login attempt may be stored in a history record associated with the user profile. When an active (current and pending) login attempt is initiated, the current location of the computing device may be compared to the historical location data that describes the location(s) from which the user typically performs the authentication process. If the current location of the computing device being used for the active login attempt is consistent with the historical location data associated with the user profile, then the current (contemporaneous) location of the computing device may corroborate the authentication of the authorized user or build a confidence level in authentication of the authorized user. Optionally, the historical location data may be static or dynamic. In one example, if the login credentials associated with an authorized user profile have been consistently used to login to the system from the same location, then an active login attempt using the login credentials from that same location is not unusual and does not raise additional security concerns. However, if the authorized user's login credentials are used in an active login attempt from a new location that is not stored in the historical record associated with the user profile, then this may raise a security concern such that additional authentication factors may be required to achieve authentication and gain access to the system.

In some embodiments, the user profile may store identification or an address of a user calendar. Accordingly, the security system or application may determine whether the circumstances surrounding an active login attempt are "consistent with" or in "alignment with" the user's calendar. For example, a login attempt (request for access to a system resource) may be inconsistent with (or suspicious in view of) a user's calendar entries if the login attempt occurred during a period of time that the calendar identifies as the user's vacation. Conversely, a login attempt may be consistent with a user's calendar entries if the login attempt occurred at a time that the user's calendar indicates is a regular workday when nothing else was scheduled. As another example, if the user's calendar shows attendance at a meeting in a specific physical location at a certain time, and the login attempt comes from a completely different location, then a confidence level in the person being the authorized user would be decreased and additional authentication may be required. Optionally, each calendar entry may identify a time and a location which may be compared with the time and location of a user's device attempting a login. An actual login time and/or location that is consistent with the user's calendar (expected activity times and locations) may increase an overall confidence level in the authentication of the person making the login attempt. Conversely, if the actual time and/or location of a login attempt is inconsistent with the user's calendar then this may decrease an overall confidence level in the authentication of the person making the login attempt such that the security system or application may require a set of authentication factors with a greater level of confidence.

In some embodiments, the user profile may identify one or more user computing devices and those devices may include, or be in communication with, one or more biometric sensors. For example, a user may connect or pair their computing devices to the available biometric sensors or devices or the computing devices may be automatically connected if provided by their employer. Non-limiting examples of a biometric sensor or device include wearables, Internet of Things connected devices like scales, nest thermometers, any device with an infrared (IR) camera to confirm heat sources, etc. The contemporaneous biometric data received from the biometric sensor may be compared with the user's historical biometric levels during a previous successful login attempt for the purpose of identifying whether the user's current biometric data or levels are consistent or inconsistent with authentication of the person asserting to be the authorized user. In one example, if a user profile is associated with a login attempt requiring authentication, the user's current biometric data from their smartwatch heartrate sensor indicating that the user is asleep would be inconsistent with the login attempt (i.e., the contemporaneous heartrate is substantially lower than during previous successful logins) and would reduce a confidence level in authentication of the person. If a user's contemporaneous biometric data includes a very high heartrate indicating that the user may be exercising or under duress, then this data may reduce confidence in authentication of the person attempting to login on the assertion of being the authorized user. Baseline biometric data for the authorized user may be static or dynamically updated over time based on the obtained biometric data associated with a successful login.

Some embodiments may implement multiple layers of authentication beginning with Layer 1 and increasing in confidence level at each subsequent layer (i.e., Layer 2, Layer 3, and so on in sequence). This is a non-limiting example of one embodiment.

Layer 1: If all of the data obtained from the user data sources during an active login attempt is consistent with (aligned with) the conclusion that the person who submitted the credentials is the authorized user associated with the user profile containing those credentials, then the system may allow Business As Usual ("BAU"; aka "normal") password processing. If an authorized user consistently logs into a system or system resource at a certain time/range or time, from a certain location(s), using a certain password, then the values of these parameters are normal (expected conditions) and become associated with the user profile. Any active login attempt for which the data obtained from the user data sources is consistent with the historical values of these parameters does not require an additional authentication factor or a stronger set of authentication factors.

Layer 2: During an active login attempt, if the data obtained from one of the user data sources is not consistent with the person being the authorized user associated with the user profile containing the submitted credentials, then the security system may require the person to take an additional measure in order to continue the authentication process. For example, the additional measure may be the use of a virtual private network (VPN) to access the system resource or satisfy a set of authentication factors having a higher level of confidence.

Layer 3: During an active login attempt, if the data obtained from two of the user data sources is not consistent with the person being the authorized user associated with the user profile containing the submitted credentials, then the security system may require the person to take an additional one or more measure in order to continue the authentication process. For example, the additional one or more measure may include submission of biometric data (an authentication factor), such as the user's fingerprint via a known fingerprint scanner.

Layer 4: During an active login attempt, if the data obtained from more than two of the user data sources is not consistent with the person being the authorized user associated with the user profile containing the submitted credentials, then the security system may require a second user to authorize, corroborate or co-sign the authentication process. For example, the second user could be a system administrator, the user's direct manager, or any user with higher credentials than the person performing the login attempt. In one option, the security system may send a message to the second user and request that they login (authenticate) to the system, then authorize the active login attempt of the person or otherwise authenticate that the person is the authorized user associated with the user profile with the received user credentials. Optionally, the second user may be provided with a notification identifying the conditions related to the active login attempt that were suspect (i.e., the obtained data that was not consistent with the person being the authorized user) and caused the requirement for the second user to authorize the successful completion of the active login attempt.

The foregoing computer program products may include program instructions for implementing or initiating any one or more operations of the methods described herein. Furthermore, any of the operations performed by a processor executing program instructions may be implemented as a computer implemented method or as an apparatus capable of performing the operations. For example, the apparatus may comprise at least one non-volatile storage device storing program instructions and at least one processor configured to process the program instructions, wherein the program instructions are configured to, when processed by the at least one processor, cause the apparatus to perform the operations.

FIG. 1 is a diagram of a system 10 including a security system 20 controlling access to various system resources 24. The security system 20 performs operations according to access control logic 21. The access control logic 21 of the security system 20 may receive user credentials from a person 12 using the computing device 14 for the purpose of attempting to login and gain access to the system resources 24. The access control logic 21 may use information stored in an authorized user data structure 22 including a plurality of user profiles 23 to determine whether the person 12 is an authorized user associated with one of the user profiles 23.

The access control logic 21 may use the received user credentials to identify one of the user profiles 23 that includes those user credentials. The identified user profile may identify various user data sources 30 where the security system 20 may obtain data about the user, such as the user's laptop computer 31 (including a camera 32 for facial recognition, a fingerprint scanner 33, a built-in GPS sensor (symbolically shown at 34, and a trackpad 35 for inputting gestures), the user's smartphone 36 (including a camera 37 for facial recognition, and a microphone 38 for voice recognition), a user's smartwatch 39 (including a heartrate sensor 40) paired to the smartphone 36, a wireless headset 41 (including a microphone 42 for voice recognition) paired to the laptop computer 31, and a user calendar 43 accessible over a network 16 (including various events identified by event type/name, event location and event time/time range). The access control logic 21 may obtain data from the user data sources 30 identified in the user profile to determine whether the person 12 submitting the user credentials associated with the user profile is actually the authorized user associated with the user profile. Additional authentication factors may be required of the person if the obtained data is not consistent with the person being the authorized user. However, upon receiving sufficient authentication, the security system 20 may grant the person access to the system resources. For example, the system resources may include applications 25, data 26, networking 27, compute nodes 28 and/or services 29, without limitation.

FIG. 2 is a diagram of a graphical user interface for a user profile 50 that could be one of the plurality of user profiles 23 stored in the authorized user data structure 22 that may be used by the security application 21 shown in FIG. 1. The user profile 50 includes aspects of various embodiments disclosed herein and should not be considered as limiting the scope of any particular embodiment. The user profile 50 may be a record of a database forming the authorized user data structure. Furthermore, the user profile 50 may include fields for storing data such as character strings, Boolean values identifying whether aspects of the user profile are true or false, and/or historical record associated with the user.

Beginning at the top of FIG. 2 and moving toward the bottom, the illustrated user profile 50 identifies an authorized user by name, address and phone number. The authorized system resources are listed and the accessed system resources or successful login history is provided. The accessed system resources may include its own series of records for each successful login. An accessed system resource record may identify a system resource that was accessed, a day or time of the access, a login location where a computing device was used to successfully login, and any contemporaneous user data, such as biometric data, obtained during the login attempt.

Data sources associated with the user are also identified in a plurality of records, where each record may identify information about one data source such as a device type, an address of the device, credentials necessary to obtain data from the device, and the type of data that may be obtained from the device. Four non-limiting examples are shown, including a laptop, smartphone, calendar and smartwatch.

The user profile also includes an area identifying authentication factors that the user may submit. If the user has devices with certain biometric capabilities, such as a fingerprint scanner on their laptop computer, this can be identified to the security system as a potential authentication factor for this authorized user whereas another authorized user may not have a fingerprint scanner on their computer. The security system would not be served to demand that an authorized user provide a fingerprint if the authorized user's devices do not have a fingerprint scanner. So, identifying the capabilities of the user's devices to the security system lets the system know what authentication factors may be required.

As shown, the authentication factors includes a username/password, personal identification number (PIN), whether a one-time password to the user's phone is enabled, whether the authorized user has a fingerprint stored with the user profile and a fingerprint scanner enabled, whether the authorized user has a voice sample stored with the user profile and voice recognition enabled, whether facial recognition has been setup on a user device, whether a retina/iris scan is enabled, whether geolocation has been enabled, and whether a touchscreen gesture has been stored with the user profile and enabled? Some or all of these authentication factors, and perhaps others, may be used by the security system or application to authenticate the authorized user.

Figure 3:
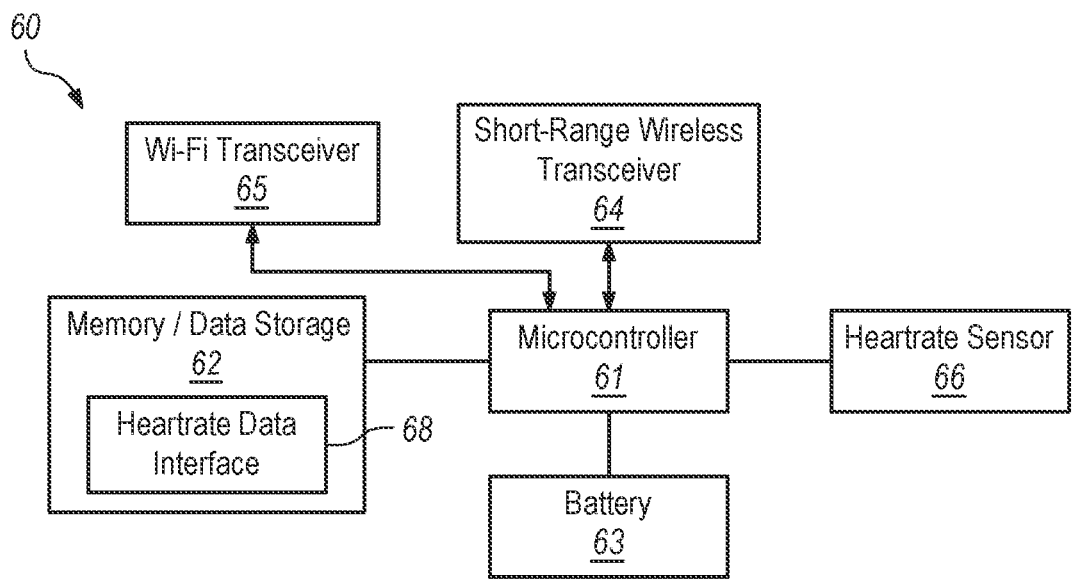
FIG. 3 is a block diagram of a user device having a first architecture according to one embodiment.

FIG. 3 is a block diagram of a user data source or device 60 in the form of a smartwatch according to one embodiment. The device 60 may include a microcontroller/processor 61, memory 62, a battery 63, a short-range wireless transceiver 64 (perhaps Bluetooth), a Wi-Fi transceiver 65, and a heartrate sensor 66. The battery 63 provides power to each of the other components and allows the device 60 to be mobile and wearable. The microcontroller/processor 61 may access the memory 62 to read and/or write data and/or read program instructions such as the heartrate data interface 68. The program instructions that may be executed by the microcontroller 61 to cause the performance of various operations, including the sharing of heartrate data with the security system or application according to various embodiments.

Figure 4:
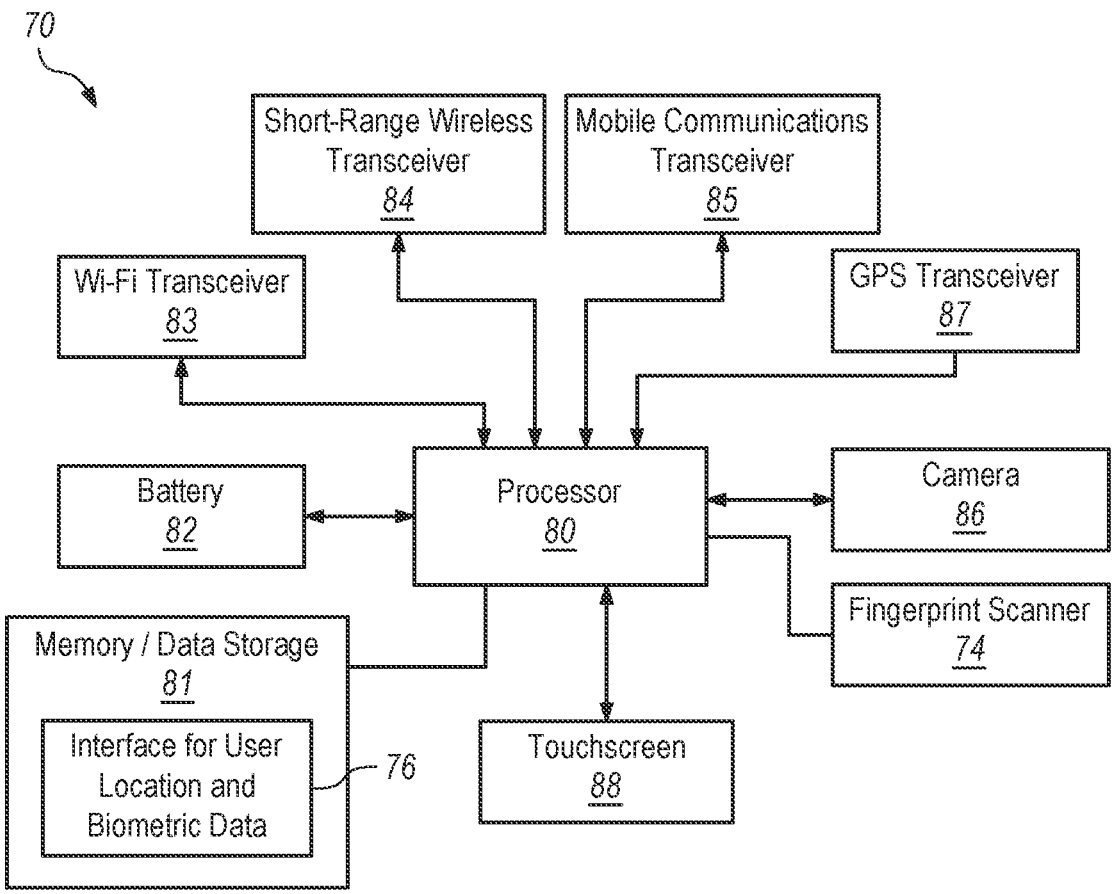
FIG. 4 is a block diagram of a user computing device having a second architecture according to one embodiment.

FIG. 4 is a block diagram of a user computing device 70, such as a smartphone, having a second architecture according to one embodiment. The computing device 70 includes a processor 80, memory or data storage device 81, a battery or other energy storage device 82, a camera or other input and/or output device 86, and a fingerprint scanner 74. The computing device 70 may further include a touchscreen 88, short-range wireless transceiver 84, a wireless local area network transceiver ("Wi-Fi transceiver") 83, a mobile communication transceiver 85 for communication with a cellular communication network, and a global positioning system (GPS) transceiver 87.

The memory 81 may store one or more applications including program instructions that are executable by the processor 80. Such applications may include an operating system and applications that may perform various operations of the computing device embodiments described herein. For example, the memory 81 may include an interface (application program) for user location data and/or biometric data 76 according to some embodiments.

Figure 5:
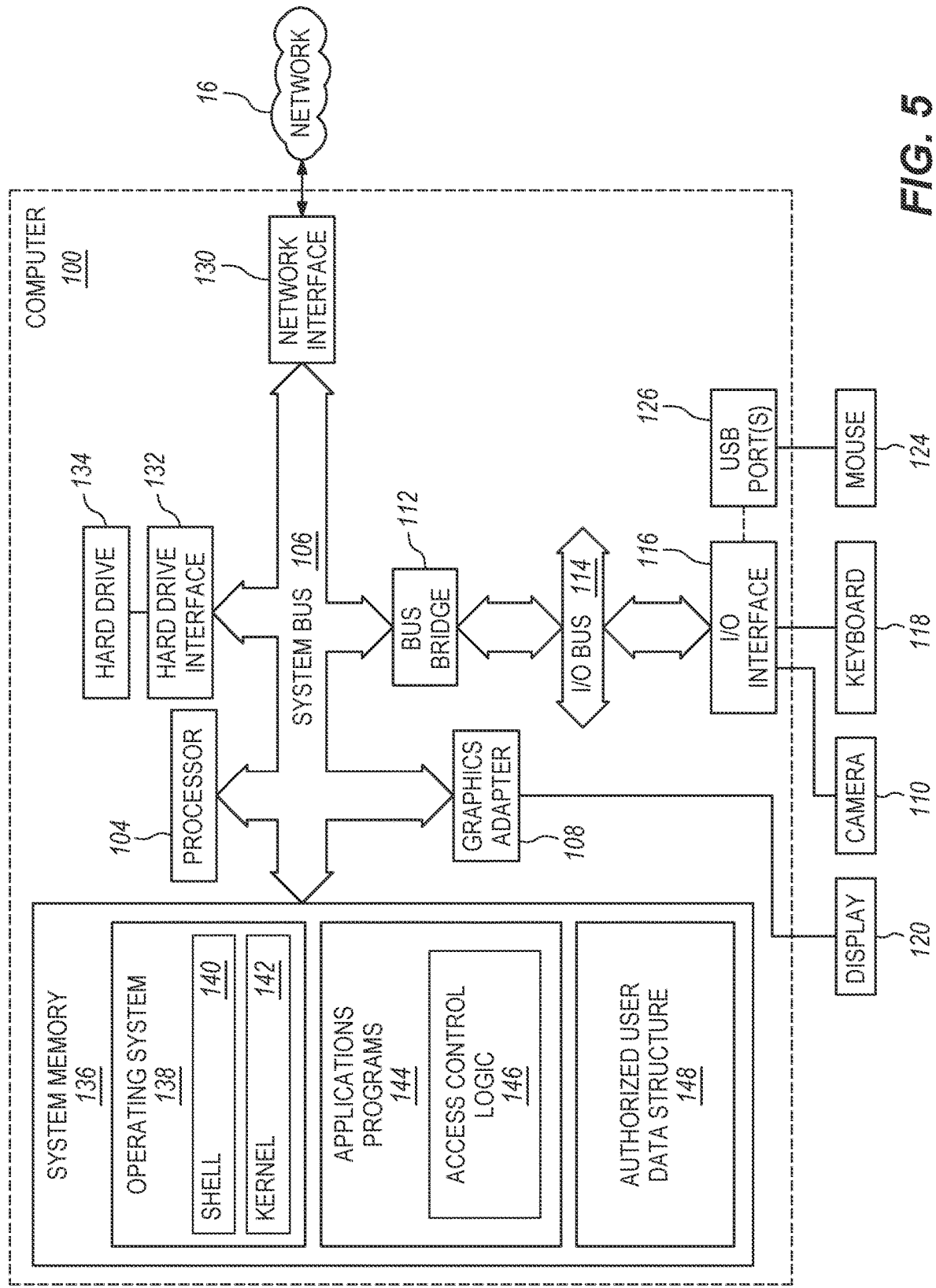
FIG. 5 is a block diagram of a computer that may perform various operations of the security system in accordance with some embodiments.

FIG. 5 is a block diagram of a computer 100 that may be representative of a computer implementing the security system 20, a computer 14 used by the person 12 attempting the login, and/or the computer 31 of the authorized user as shown in FIG. 1. As shown in FIG. 5, the computer 100 may perform various operations of the security system in accordance with some embodiments. For example, the computer 100 may perform the access control logic 146 (see also access control logic 21 in FIG. 1) and have access to the authorized user data structure 148 (see also the authorized user data structure 22 in FIG. 1)

The computer 100 includes a processor unit 104 that is coupled to a system bus 106. The processor unit 104 may utilize one or more processors, each of which has one or more processor cores. A graphics adapter 108, which drives/supports the display 120, is also coupled to system bus 106. The graphics adapter 108 may, for example, include a graphics processing unit (GPU). The system bus 106 is coupled via a bus bridge 112 to an input/output (I/O) bus 114. An I/O interface 116 is coupled to the I/O bus 114. The I/O interface 116 affords communication with various I/O devices, including a camera 110, a keyboard 118 (such as a touch screen virtual keyboard), and a USB mouse 124 via USB port(s) 126 (or other type of pointing device, such as a trackpad). As depicted, the computer 100 is able to communicate with other network devices over the network 16 using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory may include additional higher levels of volatile memory (not shown), including, but not limited to, cache memory, registers and buffers. Data that populates the system memory 136 may include an operating system (OS) 138 and application programs 144. Embodiments may include application programs that include the program instructions for the access control logic 148 that causes the processor 104 to perform the operations according to one or more embodiments.

The operating system 138 for the computer 100 may include a shell 140 for providing transparent user access to resources such as the application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell may provide a system prompt, interpret commands entered by keyboard, mouse, or other user input media, and send the interpreted command(s) to the appropriate lower levels of the operating system (e.g., a kernel 142) for processing. Note that while the shell 140 may be a text-based, line-oriented user interface, embodiments may support other user interface modes, such as graphical, voice, gestural, etc.

As depicted, the operating system 138 also includes the kernel 142, which may include lower levels of functionality for the operating system 138, including providing essential services required by other parts of the operating system 138 and application programs 144. Such essential services may include memory management, process and task management, disk management, and mouse and keyboard management.

Figure 6:
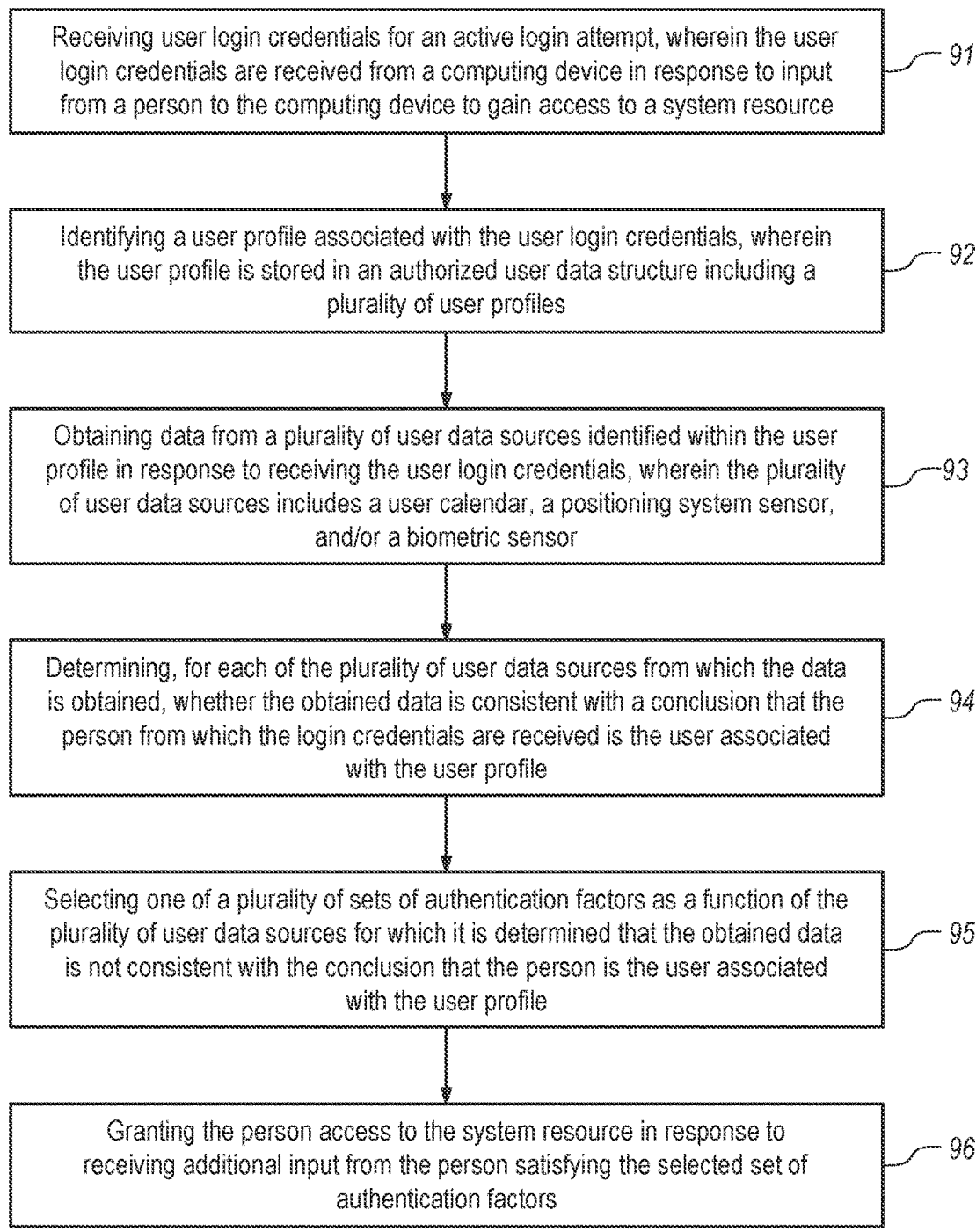
FIG. 6 is a flowchart of operations in accordance with some embodiments.

FIG. 6 is flowchart of operations 90 in accordance with some embodiments of the access control logic. Operation 91 includes receiving user login credentials for an active login attempt, wherein the user login credentials are received from a computing device in response to input from a person to the computing device to gain access to a system resource. Operation 92 includes identifying a user profile associated with the user login credentials, wherein the user profile is stored within an authorized user data structure including a plurality of user profiles. Operation 93 includes obtaining data from a plurality of user data sources identified within the user profile in response to receiving the user login credentials, wherein the plurality of user data sources includes a user calendar, a positioning system sensor, and/or a biometric sensor. Operation 94 includes determining, for each of the plurality of user data sources from which the data is obtained, whether the obtained data is consistent with a conclusion that the person from which the login credentials are received is the user associated with the user profile. Operation 95 includes selecting one of a plurality of sets of authentication factors as a function of the plurality of user data sources for which it is determined that the obtained data is not consistent with the conclusion that the person is the user associated with the user profile. Operation 96 includes granting the person access to the system resource in response to receiving additional input from the person satisfying the selected set of authentication factors.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause the processor to perform operations comprising:

receiving user login credentials for an active login attempt, wherein the user login credentials are received from a computing device in response to input from a person to the computing device to gain access to a system resource;

identifying a user profile associated with the user login credentials, wherein the user profile is stored in an authorized user data structure including a plurality of user profiles;

obtaining data from a plurality of user data sources identified within the user profile in response to receiving the user login credentials, wherein the plurality of user data sources includes a user calendar, a positioning system sensor, and/or a biometric sensor;

determining, for each of the plurality of user data sources from which the data is obtained, whether the obtained data is consistent with a conclusion that the person from which the login credentials are received is the user associated with the user profile;

selecting one of a plurality of sets of authentication factors as a function of the plurality of user data sources for which it is determined that the obtained data is not consistent with the conclusion that the person is the user associated with the user profile; and granting the person access to the system resource in response to receiving additional input from the person satisfying the selected set of authentication factors.

2. The computer program product of claim 1, wherein, for each of the plurality of sets of authentication factors, the set of authentication factors differs from the other sets of authentication factors in the specific authentication factors and/or the number of authentication factors.

3. The computer program product of claim 2, wherein, for each of the plurality of sets of authentication factors, the set of authentication factors is associated with a different level of confidence that the person is the user associated with the user profile, and wherein the operation of selecting one of the plurality of sets of authentication factors includes selecting the set of authentication factors so that the associated level of confidence increases with an increasing number of the plurality of user data sources for which it is determined that the obtained data is not consistent with the conclusion.

4. The computer program product of claim 1, wherein the user profile includes an identification of authorized system resources, an identification of accessed system resources, identification of a user device with a positioning system, identification of a user calendar, and identification of one or more biometric devices.

5. The computer program product of claim 4, wherein the user profile includes a historical record of successful user logins, wherein each successful user login includes a timestamp, contemporaneous location, contemporaneous biometric sensor data, and identification of the accessed system resource.

6. The computer program product of claim 1, wherein at least one of the plurality of user data sources is a biometric sensor, the data obtained from the biometric sensor is contemporaneous biometric sensor data measured by the biometric sensor during the active login attempt, and the user profile identifies stored biometric sensor data obtained during a previous successful login for the user, and wherein the operation of determining whether the obtained data is consistent with the conclusion that the person is the user associated with the user profile includes determining whether the contemporaneous biometric sensor data is consistent with the stored biometric sensor data.

7. The computer program product of claim 1, wherein the user profile includes an identification of one or more authorized system resources that the user is authorized to access, wherein the one or more authorized system resources include an application, data, network, compute node, and/or network infrastructure.

8. The computer program product of claim 7, wherein the identification of the one or more authorized system resources included in the user profile identifies a role assigned to the user associated with the user profile, wherein the role has a predetermined association with one or more specific system resources.

9. The computer program product of claim 7, the operations further comprising:
identifying a system resource for which the user login credentials have been received for the active login attempt;
accessing the identification of one or more authorized system resources associated with the user profile; and
determining whether the identification of one or more authorized system resources includes the identified system resource, wherein the operation of selecting one of a plurality of sets of authentication factors includes selecting the set of authentication factors that is associated with an incrementally higher level of confidence than otherwise selected in response to determining that the identification of one or more authorized system resources does not include the identified system resource.

10. The computer program product of claim 1, wherein the user profile includes a historical record of successful user logins, and wherein each successful user login includes an identification of the accessed system resource.

11. The computer program product of claim 10, the operations further comprising:
identifying the system resource for which the user login credentials have been received for the active login attempt; and
determining whether the historical record of successful user logins associated with the user profile includes the identified system resource, wherein the operation of selecting one of a plurality of sets of authentication factors includes selecting the set of authentication factors that is associated with an incrementally higher level of confidence than otherwise selected in response to determining that the historical record of successful user logins does not include the identified system resource.

12. The computer program product of claim 1, the operations further comprising:
identifying a time at which the user login credentials are received from the computing device;
accessing a historical record of previous successful logins associated with the identified user profile, wherein each of the previous successful logins is associated with a login time; and
determining whether the identified time is within a range of the login times within the historical record of previous successful logins, wherein the operation of selecting one of a plurality of sets of authentication factors includes selecting the set of authentication factors that is associated with an incrementally higher level of confidence than otherwise selected in response to determining that the identified time is not within the range of the login times.

13. The computer program product of claim 12, wherein the identified time and the login time associated with each of the previous successful logins includes a time of day and/or a day of the week, month or year.

14. The computer program product of claim 1, wherein the plurality of user data sources includes a positioning system sensor, and wherein the positioning system sensor is integrated with the computing device, the operations further comprising:
identifying a contemporaneous location of the computing device from which the user login credentials are received for the active login attempt, wherein the contemporaneous location is determined by the computing device using the positioning system sensor during the active login attempt;
accessing a historical record of previous successful logins associated with the identified user profile, wherein each of the previous successful logins is associated with a login location; and
determining whether the identified contemporaneous location of the computing device is within a predetermined proximity of one of the login locations associated with one or more of the previous successful logins, wherein the operation of selecting one of a plurality of sets of authentication factors includes selecting the set of authentication factors that is associated with an incrementally higher level of confidence than otherwise selected in response to determining that the identified contemporaneous location of the computing device is not within the predetermined proximity of one of the login locations associated with the one or more of the previous successful logins.

15. The computer program product of claim 14, the operations further comprising:
updating the historical record of previous successful logins to include a further successful login associated with the identified user profile from a location that is not with the predetermined proximity of one of the login locations associated with the one or more of the previous logins.

16. The computer program product of claim 1, wherein the plurality of user data sources includes a user calendar, the operations further comprising:
identifying the user calendar associated with the identified user profile, wherein the user calendar includes a plurality of calendar entries, and wherein each calendar entry identifies an event, an event location, and an event day and time;
identifying one of the calendar entries that identifies the event day and time including the current day and time;
identifying the event location identified in the identified calendar entry, wherein the data obtained from the positioning system sensor is the contemporaneous location of the computing device during the active login attempt; and
determining whether the contemporaneous location of the computing device is within a predetermined proximity of the identified event location, wherein the operation of selecting one of a plurality of sets of authentication factors includes selecting the set of authentication factors that is associated with an incrementally higher level of confidence than otherwise selected in response to determining that the current location of the computing device is not within a predetermined proximity of the identified event location.

17. The computer program product of claim 1, wherein the one or more plurality of user data sources includes a user calendar, the operations further comprising:
identifying the user calendar associated with the identified user profile, wherein the user calendar includes a plurality of calendar entries, and wherein each calendar entry identifies an event type, an event location, and an event day and time;
identifying one of the calendar entries that identifies the event type as vacation; and
determining whether the current day and time is within the identified event day and time identified by the identified calendar entry, wherein the operation of selecting one of a plurality of sets of authentication factors includes selecting the set of authentication factors that is associated with an incrementally higher level of confidence than otherwise selected in response to determining that the current day and time is within the identified event day and time.

18. The computer program product of claim 1, wherein the plurality of user data sources includes a biometric sensor, the operations further comprising:
identifying a biometric sensor associated with the identified user profile, wherein the biometric sensor produces biometric output for the user, and wherein the biometric output from the identified biometric sensor device is contemporaneous biometric output obtained during the active login attempt;
accessing a historical record of previous successful logins associated with the identified user profile, wherein, for each of the previous successful logins, the previous successful login is associated with biometric output from the biometric sensor obtained during the previous successful login;
determining whether the obtained contemporaneous biometric output is within a predetermined range of the biometric output associated with one or more of the previous successful logins, wherein the operation of selecting one of a plurality of sets of authentication factors includes selecting the set of authentication factors that is associated with an incrementally higher level of confidence than otherwise selected in response to determining that the contemporaneous biometric output is not within the predetermined range of the biometric output associated with the one or more of the previous successful logins.

19. The computer program product of claim 1, wherein the operation of selecting one of a plurality of sets of authentication factors includes selecting the set of authentication factors that is associated with an incrementally higher level of confidence for each of the user data sources from which the obtained data is not consistent with the conclusion that the person is the user associated with the user profile.

20. The computer program product of claim 19, the operations further comprising:
determining a number of user data sources from which the obtained data is not consistent with the conclusion that the person is the user associated with the user profile;
determining whether the determined number of user data sources is greater than a predetermined number of inconsistent authentication factors; and
requiring, in response to determining that the determined number of user data sources is greater than the predetermined number of inconsistent authentication factors, receipt of approval from a second user as a condition to completing the active login attempt.

\* \* \* \* \*